US010269079B2

(12) United States Patent
Pai et al.

(10) Patent No.: US 10,269,079 B2
(45) Date of Patent: Apr. 23, 2019

(54) DETERMINING LOCAL REGULATORY FILING WORKFLOW THROUGH USER CONTRIBUTION

(71) Applicants: Yogish Pai, Santa Clara, CA (US); Steve George Goyette, Maple Ridge (CA); Robert Bruce MacMartin, Delta (CA)

(72) Inventors: Yogish Pai, Santa Clara, CA (US); Steve George Goyette, Maple Ridge (CA); Robert Bruce MacMartin, Delta (CA)

(73) Assignee: Intuit Inc., Mountain View, CA (US)

( * ) Notice: Subject to any disclaimer, the term of this patent is extended or adjusted under 35 U.S.C. 154(b) by 1212 days.

(21) Appl. No.: 14/015,877

(22) Filed: Aug. 30, 2013

(65) Prior Publication Data

US 2014/0114823 A1   Apr. 24, 2014

Related U.S. Application Data

(63) Continuation-in-part of application No. 13/655,313, filed on Oct. 18, 2012.

(51) Int. Cl.
   *G06Q 40/00* (2012.01)
(52) U.S. Cl.
   CPC .................. *G06Q 40/123* (2013.12)
(58) Field of Classification Search
   USPC .................. 705/31, 19, 40, 45, 39; 283/115; 726/25; 707/620, 708
   See application file for complete search history.

(56) References Cited

U.S. PATENT DOCUMENTS

| 5,819,249 | A  | 10/1998 | Dohanich et al. |
| 6,018,730 | A  | 1/2000  | Nichols et al.  |
| 6,202,052 | B1 | 3/2001  | Miller          |

(Continued)

FOREIGN PATENT DOCUMENTS

KR   10-1003708 B1   12/2010

OTHER PUBLICATIONS

International Search Report for PCT/US2012/050151, dated Jan. 31, 2013 (5 pages).

(Continued)

*Primary Examiner* — Tien C Nguyen
(74) *Attorney, Agent, or Firm* — Ferguson Braswell Fraser Kubasta PC (57) ABSTRACT

A method to generate a regulatory filing workflow for a geographical region. The method includes displaying a regulatory filing form to a user in the geographical region, displaying a user attribute list identifying user attributes from the BMAs used by the user, receiving, from the user and in response to displaying the regulatory filing form and the user attribute list, a user input that specifies a rule for determining input data of the regulatory filing form based at least on user attributes, and generating, based at least on the user input, regulatory filing report metadata including a specification for generating a regulatory filing report by completing the regulatory filing form based at least on the rule, where the regulatory filing workflow includes generating and filing the regulatory filing report to satisfy the regulatory requirement specific to the geographical region.

21 Claims, 8 Drawing Sheets

(56) References Cited

U.S. PATENT DOCUMENTS

| | | | |
|---|---|---|---|
| 6,253,193 B1 | 6/2001 | Ginter et al. | |
| 6,345,239 B1 * | 2/2002 | Bowman-Amuah | G06Q 20/10 703/6 |
| 7,249,072 B1 | 7/2007 | Nearhood et al. | |
| 7,398,239 B2 * | 7/2008 | Barsade | G06Q 20/10 705/31 |
| 7,603,301 B1 | 10/2009 | Regan | |
| 7,636,742 B1 | 12/2009 | Olavarrieta et al. | |
| 7,693,760 B1 | 4/2010 | Fiteni et al. | |
| 7,818,222 B2 * | 10/2010 | Allanson | G06Q 40/02 705/30 |
| 7,860,763 B1 | 12/2010 | Quinn et al. | |
| 7,970,796 B1 | 6/2011 | Narayanan | |
| 8,019,795 B2 * | 9/2011 | Anderson | G06F 17/30592 358/1.13 |
| 8,099,342 B1 | 1/2012 | Christian et al. | |
| 8,402,047 B1 | 3/2013 | Mangini et al. | |
| 8,452,676 B1 | 5/2013 | Talan et al. | |
| 8,700,504 B2 * | 4/2014 | Barsade | G06Q 20/04 705/31 |
| 9,639,898 B2 * | 5/2017 | Finley | G06Q 40/10 |
| 2001/0042080 A1 | 11/2001 | Ross | |
| 2003/0061131 A1 * | 3/2003 | Parkan, Jr. | G06Q 10/10 705/30 |
| 2004/0019540 A1 | 1/2004 | William et al. | |
| 2004/0019541 A1 | 1/2004 | William et al. | |
| 2005/0102283 A1 | 5/2005 | Anderson et al. | |
| 2006/0155618 A1 | 7/2006 | Wyle | |
| 2007/0022026 A1 * | 1/2007 | Davidson | G06Q 20/207 705/31 |
| 2008/0133216 A1 | 6/2008 | Togami | |
| 2010/0058169 A1 | 3/2010 | Demant et al. | |
| 2010/0161460 A1 | 6/2010 | Vroom et al. | |
| 2011/0197285 A1 | 8/2011 | Ginter et al. | |
| 2011/0246173 A1 | 10/2011 | Li et al. | |
| 2011/0307495 A1 | 12/2011 | Shoshan | |
| 2012/0084185 A1 | 4/2012 | Ciaramitaro et al. | |
| 2012/0141959 A1 | 6/2012 | von Ahn Arellano et al. | |
| 2012/0191580 A1 | 7/2012 | Bhatt | |
| 2012/0278213 A1 | 11/2012 | Bristow et al. | |
| 2013/0110687 A1 | 5/2013 | Sreesha | |
| 2013/0151439 A1 * | 6/2013 | Galaska | G06Q 40/00 705/36 T |

OTHER PUBLICATIONS

Written Opinion for PCT/US2012/050151, dated Jan. 31, 2013 (4 pages).

Intuit Press Release. TurboTax/MacInTax for Business Streamlines Tax Preparation for Small Business Owners. Jan. 6, 1999. http://web.intuit.com/about_intuit/press_releases/1999/01-06_1.html (2 pages).

International Search Report in corresponding International Application No. PCT/US2013/062616, dated May 19, 2014 (3 pages).

Written Opinion in corresponding Patent Application No. PCT/US2013/062616, dated May 19, 2014 (6 pages).

* cited by examiner

SCREENSHOT A
310

Chart of Accounts — 311 SERVICE A
< ALL LISTS

Filter by name        ☐ Include inactive          New    Edit    Delete    Report    Print

| NAME — 312a ATTRIBUTE A | TYPE — 312b ATTRIBUTE B | BALANCE — 312c ATTRIBUTE C | BANK BALANCE |
|---|---|---|---|
| Checking — 313a VALUE A | Bank — 313b VALUE B | 10,845.00 — 313c VALUE C | |
| USAA SECURE CHECKING (XXX 6662) | ⇔ Bank | | 0.00 |

FIG. 3A

SCREENSHOT B
320

Pai Systems
PROFIT & LOSS ← 321 SERVICE B
January 1 - August 21, 2013

|  | TOTAL |
|---|---|
| Income | |
| Primary Income | 1,200.00 |
| Total Income | $1,200.00 |
| Expenses | |
| Dues & Subscriptions | 200.00 |
| Meals and Entertainment | 240.00 |
| Total Expenses | $440.00 |
| Net Operating Income | $760.00 ← 323 VALUE |
| Net Income | |

322 ATTRIBUTE

*FIG. 3B*

Accountant Screen for setting up Forms

| Publish | Form Name | Country | Schedule | Shared |
|---|---|---|---|---|
| ✓ | Form 941 | USA | Quarterly | My Network | Edit Delete |
| ☐ | Form 2210 | USA | Exception | All | Edit Delete |
| ☐ | Form 6252 | USA | Exception | Self | Edit Delete |

+ADD FORM — ACTION BUTTON 335

FORM NAME 331
GEOGRAPHIC REGION 332
FILING SCHEDULE 333
SHARING DESIGNATION 334

SCREENSHOT C 330

DETERMINING LOCAL REGULATORY FILING WORKFLOW THROUGH USER CONTRIBUTION

CROSS REFERENCE TO RELATED APPLICATIONS

This application is a continuation-in-part (CIP) of U.S. patent application Ser. No. 13/655,313 entitled "METHOD AND SYSTEM FOR CREATING TAX CONFIGURATION TEMPLATES," filed on Oct. 18, 2012 and also assigned to the assignee of the present application. Accordingly, this application claims benefit under 35 U.S.C. § 120 to U.S. patent application Ser. No. 13/655,313. U.S. patent application Ser. No. 13/655,313 is hereby incorporated by reference in its entirety.

This application is related to co-pending U.S. patent application Ser. No. 13/523,281 entitled "SOFTWARE LOCALIZATION THROUGH USER CONTRIBUTION," also assigned to the assignee of the present application, the subject matter of which is incorporated by reference herein.

BACKGROUND

There is a worldwide trend for governments to track business tax payers' revenues with shorter latency. To achieve their objectives, the governments are requiring tax payers to be current with their taxes (e.g., payroll tax) by mandating electronic filing (i.e., e-filing, e-Files, etc.) requirements, such Real Time Information (RTI) in UK, Tax Deducted at Source (TDS) in India, and BAS Lodgment (ATO) in Australia. This mandated electronic filing results in additional burden on the accountants or book keepers to stay current with the changing regulations and to make sure that all required regulatory filings are accurate and filed on time.

SUMMARY

In general, in one aspect, the invention relates to a method to generate a regulatory filing workflow for a geographical region. The method includes obtaining regulatory filing form metadata, wherein the regulatory filing form metadata specifies a non-data-entry portion and a data-entry portion of a regulatory filing form, wherein the regulatory filing form is based on a regulatory requirement specific to the geographical region, and wherein the data-entry-field portion comprises a plurality of data entry fields, displaying, by a computer processor and based on the regulatory filing form metadata, the regulatory filing form to a first user, wherein the first user uses a plurality of business management applications (BMAs) in the geographical region, displaying, by the computer processor and in association with the regulatory filing form, a user attribute list identifying a plurality of user attributes from the plurality of BMAs, receiving, from the first user and in response to displaying the regulatory filing form and the user attribute list, a user input, wherein the user input specifies a rule for determining input data of a first data entry field of the plurality of data entry fields based at least on a first user attribute of the plurality of user attributes, and generating, by the computer processor and based at least on the user input, a plurality of regulatory filing report metadata, wherein the plurality of regulatory filing report metadata comprises a specification for generating a regulatory filing report by completing the regulatory filing form based at least on the rule, and wherein the regulatory filing workflow comprises generating and filing the regulatory filing report to satisfy the regulatory requirement specific to the geographical region.

In general, in one aspect, the invention relates to a system for generating a regulatory filing workflow for a geographical region. The system includes (1) a processor, (2) memory storing instructions executable by the processor, wherein the instructions include (i) a filing form import module configured to obtain regulatory filing form metadata, wherein the regulatory filing form metadata specifies a non-data-entry portion and a data-entry portion of a regulatory filing form, wherein the regulatory filing form is based on a regulatory requirement specific to the geographical region, and wherein the data-entry-field portion comprises a plurality of data entry fields, and (ii) a filing report specification module configured to display, based on the regulatory filing form metadata, the regulatory filing form to a first user, wherein the first user uses a plurality of business management applications (BMAs) in the geographical region, display, by the computer processor and in association with the regulatory filing form, a user attribute list identifying a plurality of user attributes from the plurality of BMAs, receive, from the first user and in response to displaying the regulatory filing form and the user attribute list, a user input, wherein the user input specifies a rule for determining input data of a first data entry field of the plurality of data entry fields based at least on a first user attribute of the plurality of user attributes, and generate, based at least on the user input, a plurality of regulatory filing report metadata, wherein the plurality of regulatory filing report metadata comprises a specification for generating a regulatory filing report by completing the regulatory filing form based at least on the rule, and (3) a repository for storing the regulatory filing form metadata and the plurality of regulatory filing report metadata, wherein the regulatory filing workflow comprises generating and filing the regulatory filing report to satisfy the regulatory requirement specific to the geographical region.

In general, in one aspect, the invention relates to a non-transitory computer readable medium storing instructions to generate a regulatory filing workflow for a geographical region. The instructions, when executed by a computer processor, include functionality for obtaining regulatory filing form metadata, wherein the regulatory filing form metadata specifies a non-data-entry portion and a data-entry portion of a regulatory filing form, wherein the regulatory filing form is based on a regulatory requirement specific to the geographical region, and wherein the data-entry-field portion comprises a plurality of data entry fields, displaying, based on the regulatory filing form metadata, the regulatory filing form to a first user, wherein the first user uses a plurality of business management applications (BMAs) in the geographical region, displaying, in association with the regulatory filing form, a user attribute list identifying a plurality of user attributes from the plurality of BMAs, receiving, from the first user and in response to displaying the regulatory filing form and the user attribute list, a user input, wherein the user input specifies a rule for determining input data of a first data entry field of the plurality of data entry fields based at least on a first user attribute of the plurality of user attributes, and generating, based at least on the user input, a plurality of regulatory filing report metadata, wherein the plurality of regulatory filing report metadata comprises a specification for generating a regulatory filing report by completing the regulatory filing form based at least on the rule, and wherein the regulatory filing workflow comprises generating and filing the regulatory filing report to satisfy the regulatory requirement specific to the geographical region.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In computing, the terms "internationalization" and "localization" refer to adapting computer software to different languages, regional differences, and regulatory requirements of a target market. Internationalization is the process of designing a software application so that the application can be adapted to various regional requirements without substantial engineering changes. Localization is the process of adapting internationalized software for a specific region by adding locale-specific components and translating text based on a language specific to the region. Throughout this disclosure, the term "geographic region" refers to a region with a set of regulatory requirements/laws under the control of a system of courts or government entity which are different to neighboring regions. Generally, the regulatory requirements are imposed on local business entities to report various regulated aspects of their business activities on a periodic basis. The term "regulatory filing report" refers to the report filed by business entities to satisfy these regulatory requirements. By way of example, the regulatory filing report may include quarterly and/or yearly small business tax filing using data from accounting and payroll applications, consumer tax filing using data from personal finance and payroll applications, filing forms reporting purchase, sales, and shipping information of highly regulated items such as chemicals and prescription drugs using data from accounting applications, equal employment opportunity (EEO) submissions to government agencies and/or non-government organizations, etc. The regulatory filing report may be generated by completing a form (referred to as a "regulatory filing form") specified by regulatory agencies of the local jurisdiction.

Embodiments of the invention provide a method and a system that allow a user (e.g., an accountant) to define a workflow to automatically generate and file a regulatory filing report based on local regulatory requirements. This user defined workflow is referred to as a regulatory filing workflow. In one or more embodiments of the invention, the regulatory filing report is automatically generated and filed by performing the regulatory filing workflow. In one or more embodiments, the regulatory filing workflow includes one or more rules to determine various input data for completing a regulatory filing form using one or more business management application as the source(s). In one or more embodiments, the regulatory filing workflow further includes a recurring filing schedule and other information necessary for electronic filing.

Figure 1:
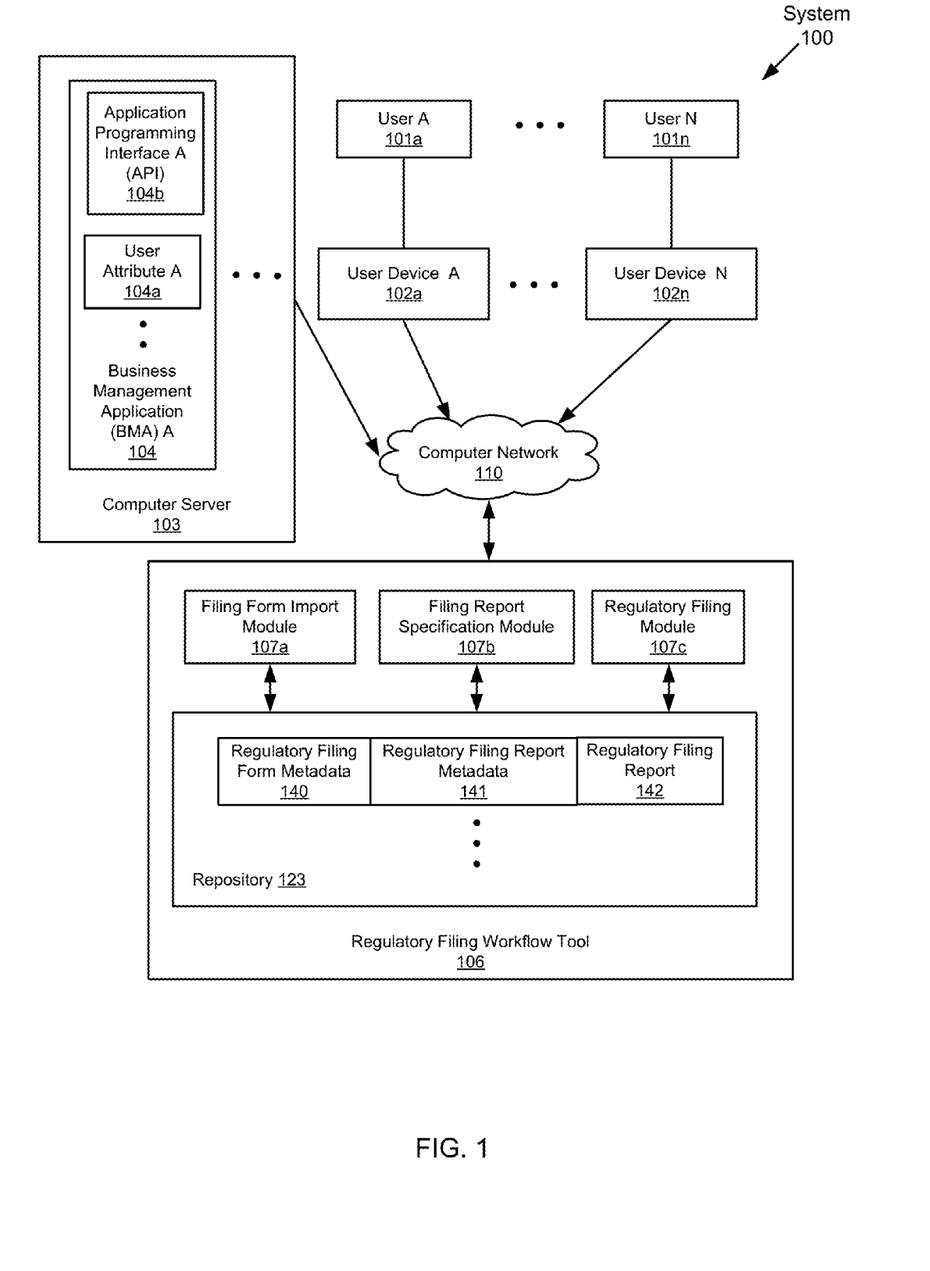
FIG. 1 shows a schematic diagram of a system of determining local regulatory filing workflow through user contribution in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a computer server (103) executing business management applications (e.g., business management application (BMA) A (104)), a regulatory filing workflow tool (106), and users (e.g., user A (101a), user N (101n), etc.) for the BMAs and/or the regulatory filing workflow tool (106). In addition, components of the system (100) are coupled via a computer network (110). For example, the computer network (110) may include wired and/or wireless portions of public and/or private data network, such as wide area networks (WANs), local area networks (LANs), Internet, etc.

In one or more embodiments of the invention, the BMAs (e.g., BMA A (104)) may include an accounting application, financial management application, payroll application, tax preparation application, personnel application, etc. used by the users (e.g., user A (101a), user N (101n), etc.) as software-as-an-service (SaaS). In one or more embodiments, the BMA A (104) is a web based application such that the users (e.g., user A (101a), user N (101n), etc.) interact with the BMA A (104) using web browsers installed on respective user devices (e.g., user device A (102a), user device N (102n), etc.). In one or more embodiments, a client portion of the BMA A (104) is downloaded onto a user device (e.g., user device A (102a)) where a user (e.g., user A (101a)) interacts with the BMA A (104) via a UI menu displayed by the client portion on the user device (e.g., user device A (102a)). In one or more embodiments, the user devices (e.g., user device A (102a), user device N (102n), etc.) may be a desktop computer, notebook computer, tablet computer, or other suitable mobile computing devices such as a smartphone.

In one or more embodiments, the BMA A (104) stores user data using user attributes (e.g., user attribute A (104a)). In particular, the user attribute A (104a) is a data item managed by the BMA A (104) on a user-by-user basis. For example, the user attribute A (104a) may correspond to an item (e.g., company name, account balance, employee count, etc.) in a company profile, chart of account, balance sheet, profit & loss, trial balance, employee database, etc. Accordingly, the user attribute A (104a) for the user A (101a) may store a value of the item (e.g., company name, account balance, etc.) in the company profile, chart of account, balance sheet, profit & loss, trial balance, employee database, etc. of the user A (101a). Similarly, the user attribute A (104a) for the user N (101n) may store a value of the item in the company profile, chart of account, balance sheet, profit & loss, trial balance, employee database, etc. of the user N (101n). In one or more embodiments, the user attribute A (104a) and its value, among other user attributes/values for the user A (101a) may be viewed by the user A (101a) using the BMA A (104). In one or more embodiments, the user attribute A (104a) and its value, among other user attributes/values for the user A (101a) may be accessible via the application programming interface (API) A (104b) of the BMA A (104). An example of user attributes and values thereof are described in reference to FIGS. 3A and 3B below.

In one or more embodiments of the invention, the users (e.g., user A (101a), user N (101n), etc.) are in a particular geographical region and contribute to define the regulatory filing workflow using the regulatory filing workflow tool (106). Accordingly, the user contributed regulatory filing workflow is shared by the users (e.g., user A (101a), user N (101n), etc.). For example, the user A (101a) may by an employee or a business owner of a business entity while the user N (101n) may be an independent CPA (certified public accountant) providing service to the business entity. In one or more embodiments, the user N (101n) (e.g., the independent CPA) may define a particular regulatory filing workflow that is used by the user A (101a) (e.g., a client of the CPA). Details of using the regulatory filing workflow tool (106) to define the regulatory filing workflow in a user-contributed manner and using the regulatory filing workflow tool (106) to automatically generate and file the regulatory filing report are described below.

In one or more embodiments of the invention, the regulatory filing workflow tool (106) includes a filing form import module (107a), a filing report specification module (107b), a regulatory filing module (107c), and a repository (123) for storing intermediate data and resultant outputs of these three modules. As shown in FIG. 1, the repository (123) stores (i) the regulatory filing form metadata (140), which is the output of the filing form import module (107a) and the input to the filing report specification module (107b), (ii) the regulatory filing report metadata (140), which is the output of the filing report specification module (107b) and input to the regulatory filing module (107c), and (iii) the regulatory filing report (142), which is the output of the regulatory filing module (107c). In one or more embodiments, the repository (123) may include a disk drive storage device, a semiconductor storage device, other suitable computer data storage device, or combinations thereof. In one or more embodiments, content stored in the repository (123) may be a data file, a linked list, a data sequence, a database, a graphical representation, or any other suitable data structure.

In one or more embodiments, the filing form import module (107a) is configured to obtain metadata associated with a regulatory filing form and store the metadata in the repository (123) as the regulatory filing form metadata (140). Generally, the regulatory filing form conforms to a regulatory requirement specific to the geographical region where the users (e.g., user A (101a), user N (101n), etc.) reside. Specifically, the regulatory filing form metadata specifies the layout of the regulatory filing form, including the data entry fields and other non-data-entry-field information, such as the title, label, other description of the data entry fields, etc. In one or more embodiments, the regulatory filing form metadata is imported from a publically available source in a standard format, such as the Portable Document Format (PDF) known to those skilled in the art. In one or more embodiments, the regulatory filing form metadata (140) is generated by the user scanning the regulatory filing form using a document scanner. In one or more embodiments, the regulatory filing form metadata (140) is generated by the user using a suitable document creation tool.

In one or more embodiments, the filing report specification module (107b) is configured to generate a specification of the regulatory filing report and store the specification in the repository (123) as the regulatory filing report metadata (141). Specifically, the regulatory filing report metadata (141) includes (i) one or more rules for determining input data for applicable data entry fields of the regulatory filing form using user attribute values of selected BMAs, (ii) a regulatory agency for filing the regulatory filing report, and (iii) a filing schedule dictated by the regulatory requirement. In one or more embodiments, the regulatory filing report metadata (141) is generated by the filing report specification module (107b) using the method (in particular Steps 202 through 205) described in reference to FIG. 2 below. An example of generating the regulatory filing report metadata (141) is described in reference to FIGS. 3A, 3B, 3C, 3D, and 3E below.

In one or more embodiments, the regulatory filing module (107c) is configured to automatically generate and file the regulatory filing report (142) to render the user A (101a) in compliance with local regulatory requirements. In one or more embodiments, the regulatory filing report (142) is generated and submitted for filing by the regulatory filing module (107c) using the method (in particular Steps 206 through 209) described in reference to FIG. 2 below. An example of generating and filing the regulatory filing report (142) is described in reference to FIGS. 3A, 3B, 3C, 3D, and 3E below.

Although the computer server (103) and the regulatory filing workflow tool (106) are shown as separate elements of the system (100), in one or more embodiments, the regulatory filing workflow tool (106) or a portion thereof may be integrated with the computer server (103). For example, one or more of the components of the regulatory filing workflow tool (106) may be included in one or more of the BMAs, such as the BMA A (104).

Figure 2:
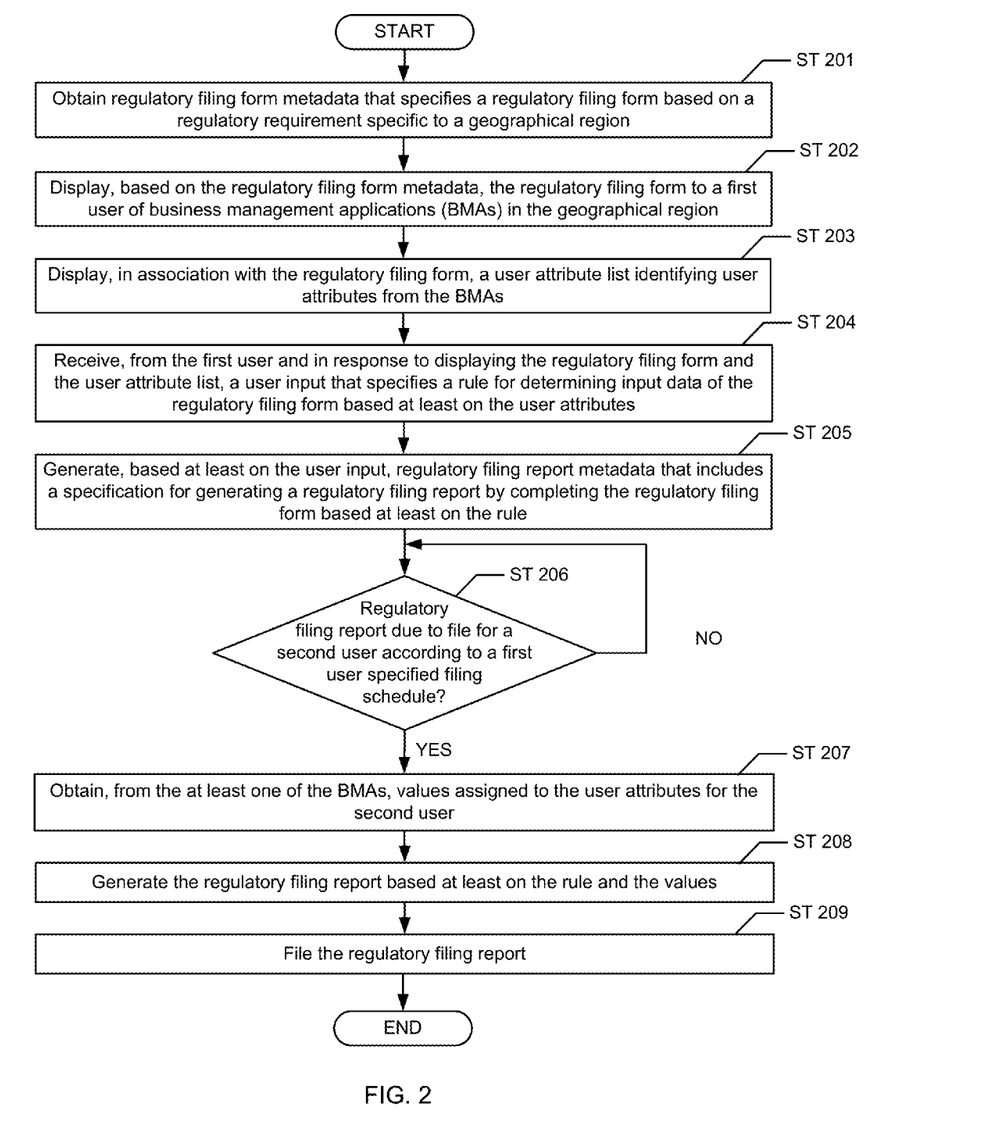
FIG. 2 shows a flowchart of a method of determining local regulatory filing workflow through user contribution in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, regulatory filing form metadata associated with a regulatory filing form is obtained. Generally, the regulatory filing form conforms to a regulatory requirement specific to a geographical region. Specifically, the regulatory filing form metadata specifies the layout of the regulatory filing form, including the data entry fields and other non-data-entry-field information, such as the title, label, other description of the data entry fields, etc. In one or more embodiments, the regulatory filing form metadata is imported from a publically available source in a standard format, such as the Portable Document Format (PDF) known to those skilled in the art. In one or more embodiments, the regulatory filing form metadata is generated by the user scanning the regulatory filing form using a document scanner. In one or more embodiments, the regulatory filing form metadata is generated by the user using a suitable document creation tool.

In Step 202, based on the regulatory filing form metadata, the regulatory filing form is displayed to a first user (e.g., an expert user such as an independent CPA) who uses a collection of business management applications (BMAs) in the geographical region. In one or more embodiments, the BMAs may include an accounting application, financial management application, payroll application, tax preparation application, personnel application, etc. that are used by the users as software-as-a-service (SaaS). For example, these users may include the first user (e.g., the CPA) referred to as the expert user and a second user who is a small business (e.g., serviced by the CPA) referred to as the SMB user. In one or more embodiments, the BMA stores user data using user attributes, which are data items managed by the BMA on a user-by-user basis. For example, a user attribute may correspond to an item (e.g., company name, account balance, etc.) in a company profile, chart of account, balance sheet, profit & loss, trial balance, employee database, etc. For example, the user attribute for the SMB user may store a value of the item (e.g., company name, account balance, employee count, etc.) in the company profile, chart of account, balance sheet, profit & loss, trial balance, employee database, etc. of the SMB user. In one or more embodiments, the user attribute and its value, among other user attributes/values of the SMB user may be viewed by the SMB user using the BMA. In one or more embodiments, the user attribute and its value, among other user attributes/values for the SMB user may be accessible via an application programming interface (API) of the BMAs. An example of user attributes and values thereof is described in reference to FIGS. 3A and 3B below.

In Step 203, a user attribute list is displayed in association with the regulatory filing form. In one or more embodiments, the user attribute list and the regulatory filing form are displayed in the same display window for the expert user to view simultaneously. In particular, the user attribute list identifies a list of user attributes from the BMAs. For example, the list of user attributes may include a company name in the company profile, an account balance in a balance sheet, an employee count in an employee database, and/or other items in a chart of account, profit & loss, trial balance, etc. In one or more embodiments, the user attribute list may be a top level in a hierarchy of user attributes from the BMAs. For example, the user attribute list may identify the company profile, chart of account, balance sheet, profit & loss, trial balance, employee database, etc., while specific items, such as the company name, account balance, employee count, etc. are hidden from the displayed user attribute list.

In Step 204, in response to displaying the regulatory filing form and the user attribute list, a user input is received from the expert user. In one or more embodiments, the user input specifies a rule for determining input data to the regulatory filing form based at least on the user attributes. Specifically, the rule may be used to determine the input data of a data entry field in the regulatory filing form based one or more of the user attributes. For example, the rule may be in the form of a formula, a look-up table, an association list, or other suitable format for describing a rule.

In one or more embodiments, the user input may include a graphical user interface (GUI) operation (e.g., a drag-N-drop operation). For example the drag-N-drop operation may map a user attribute from the displayed user attribute list to a particular data entry field on the displayed regulatory filing form. This mapping designates that the value of the mapped user attribute is to be used as the input data for the particular data entry field for completing the regulatory filing form.

In one or more embodiments, the user input may include multiple GUI operations (e.g., a drag-N-drop operation, selecting operation, etc.) to define the rule for a particular data entry field on the displayed regulatory filing form. For example, the GUI operations may select a look-up table or mathematical and/or logical operations of a formula. The GUI operations may also select one or more user attributes from the displayed user attribute list as indices to the look-up table or input variables of the formula. In one or more embodiments, the user input may also specify a regulatory agency and/or a filing schedule for filing the regulatory filing report.

In one or more embodiments, the regulatory filing report metadata is generated using the regulatory filing workflow tool (106), in particular the filing report specification module (107b) described in reference to FIG. 1 above. An example of defining the rules for data entry fields on the displayed regulatory filing form by mapping the user attribute list is described in reference to FIGS. 3C and 3D below.

In Step 205, regulatory filing report metadata is generated based at least on the user input. Specifically, the regulatory filing report metadata includes a specification for generating a regulatory filing report by completing the regulatory filing form based on one or more rules provided by the aforementioned user input. The regulatory filing report metadata may also include the regulatory agency and/or the filing schedule. In one or more embodiments, the regulatory filing report metadata is used to define a regulatory filing workflow, which is described as Steps 206 through 209 below. In one or more embodiments, the regulatory filing workflow is defined by the aforementioned expert user (e.g., the CPA) for filing the regulatory filing report on behalf of the expert user's business affiliates, (e.g., the aforementioned SMB user who are clients of the CPA). For example, the regulatory filing workflow, once defined by the CPA, is performed without intervention from the SMB user, to render the SMB user in compliance with the local regulatory requirement.

In Step 206, a determination is made as to whether the regulatory filing report is due to file for a user (e.g., the SMB user) according to the filing schedule (e.g., as defined by the expert user on behalf of the SMB user). If the determination is negative (i.e., the regulatory report is not yet due), the Step 206 repeats till it is determined that the regulatory filing report is due to file. When the determination becomes positive (i.e., the regulatory report is now due to file), the method proceeds to Step 207.

In Step 207, the values assigned to the user attributes are obtained from the BMAs. For example, the BMAs may be the aforementioned SaaS while the values (referred to as the user attribute values, such as the company name, account balance, employee count, etc.) may be retrieved from the BMAs under the SMB user's SaaS account. In one or more embodiments, the user attribute values retrieved from the BMAs under the SMB user's SaaS account are referred to as the SMB user's BMA data.

In Step 208, the regulatory filing report is generated by completing the regulatory filing form based at least on the retrieved user attribute values. Specifically, these retrieved user attribute values are used to determine the input data to the regulatory filing form according to one or more rules specified by the corresponding regulatory filing form metadata. For example, the regulatory filing workflow may be defined by the CPA for the SMB user, and the regulatory filing form is completed based on the SMB user's BMA data to generate the regulatory filing report.

In Step 209, the regulatory filing report is filed. In one or more embodiments, the regulatory filing report is filed based on approval. For example, the regulatory filing workflow may be defined by the CPA for the SMB user. The automatically generated regulatory filing report based on the SMB user's BMA data is then submitted to the CPA for review and approval. Once approved by the CPA, the automatically generated regulatory filing report is submitted to the regulatory agency for filing. Accordingly, the SMB user stays in compliance with the regulatory filing requirement automatically without taking time and attention away from the SMB user's core business.

In another example, the regulatory filing workflow may be defined by an expert user and shared by other affiliated or un-affiliated SMB users. The automatically generated regulatory filing report based on the SMB user's BMA data may then be submitted to the same SMB user for review, approval, and filing. In yet another example, the regulatory filing workflow may be defined by any user. The automatically generated regulatory filing report based on the user's BMA data may then be submitted to the same user for review, approval, and filing.

In one or more embodiments, the regulatory filing report is filed using the regulatory filing workflow tool (106), in particular the regulatory filing module (107c) described in reference to FIG. 1 above. An example of filing the regulatory filing report using the regulatory filing workflow is described in reference to FIG. 3E below.

FIGS. 3A, 3B, 3C, 3D, and 3E show an application example in accordance with one or more embodiments of the invention. This application example may be practiced using the system (100) of FIG. 1 and based on the method described with respect to FIG. 2 above.

Figure 3A:
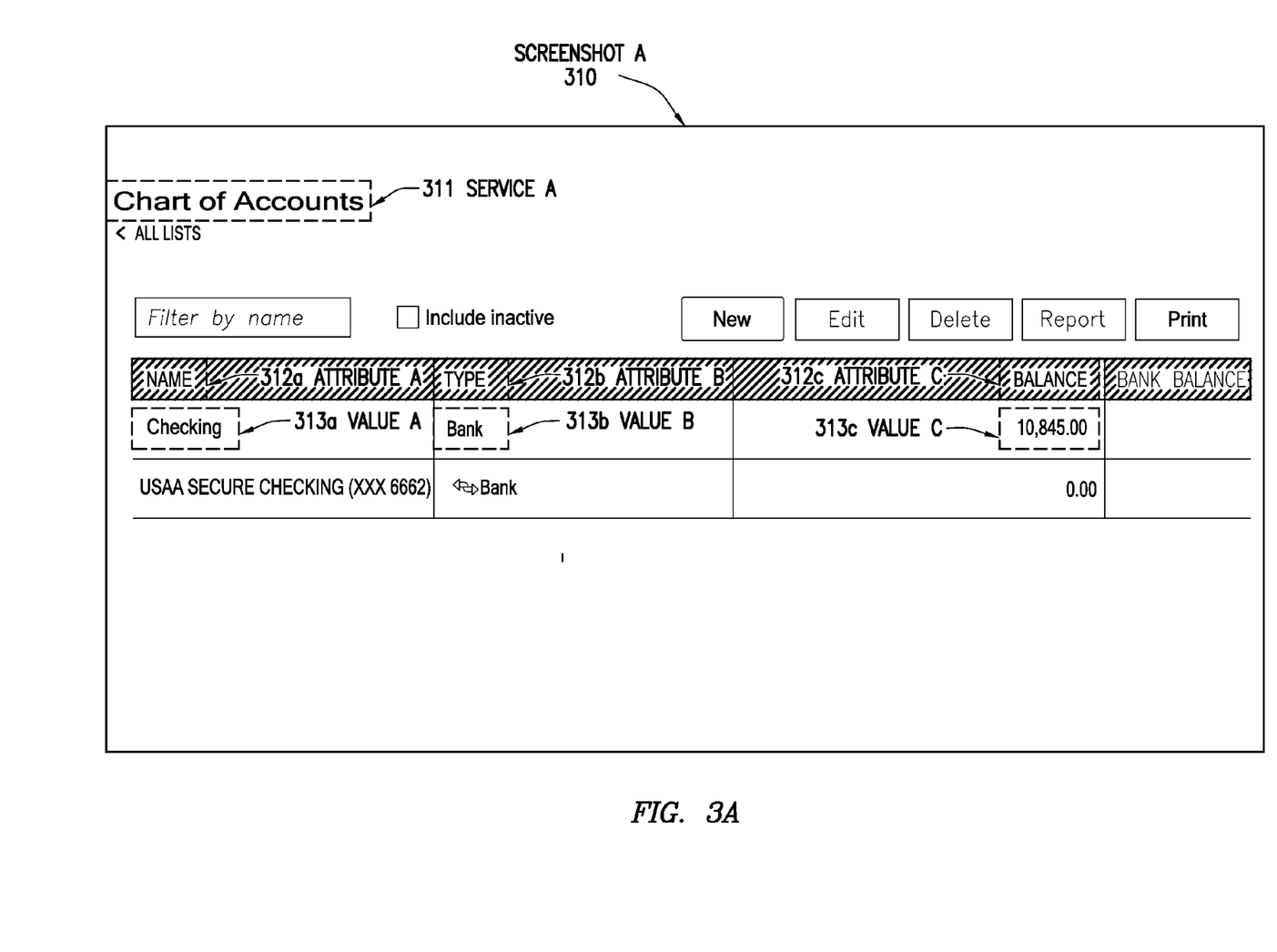
FIGS. 3A, 3B, 3C, 3D, and 3E show an example of determining local regulatory filing workflow through user contribution in accordance with one or more embodiments of the invention.

FIG. 3A shows a screenshot A (310) of a user interface menu in an accounting software. Specifically, the user interface menu allows a user to view a chart of accounts, which is a hierarchy level in the user attribute list described above. In particular, the chart of accounts includes lower level user attributes, such as the attribute A (312a), attribute B (312b), and attribute C (312c), which corresponds to the account name, account type, and account balance, respectively. As shown in FIG. 3A, the values for a particular SMB user of the accounting software is displayed as the value A (313a), value B (313b), and value C (313c), which shows that the particular SMB user has a checking account of the type "bank" and a checking account balance of $10,845. As described above, these user attribute A (312a), attribute B (312b), and attribute C (312c) may be listed in a user attribute list for mapping to data entry fields of a regulatory filing form. Accordingly, the corresponding user attribute values may be retrieved via the API of the accounting software by the regulatory filing workflow tool and used to generate input data for completing the regulatory filing form, thus generating the regulatory filing report. In one or more embodiments, the user attribute list may list the chart of accounts as a service of the API for providing user attribute values of lower level attributes. Accordingly, the chart of accounts is labeled as the service A (311) shown in the screenshot A (310).

Figure 3B:
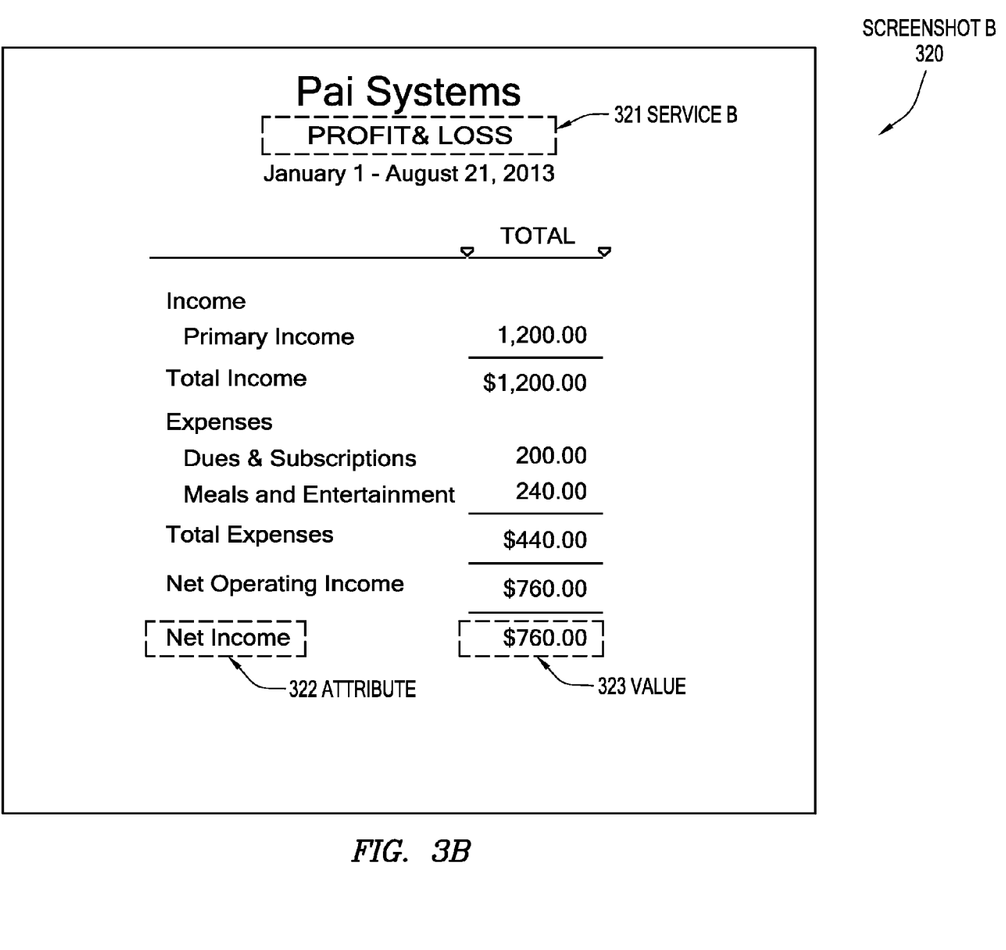

FIG. 3B shows a screenshot B (320) of a user interface menu in a financial management software, which is also used by the same SMB user who uses the accounting software depicted in FIG. 3A above. Specifically, this user interface menu allows a user to view a profit and loss report generated by the financial management software. Similar to the chart of accounts depicted in FIG. 3A, the profit and loss report is another hierarchy level in the user attribute list described above. In particular, the profit and loss report includes lower level user attributes, such as the attribute (322), which corresponds to the net income. As shown in FIG. 3B, the value for the SMB user is displayed as the value (323), which shows that the SMB user has a net income of $760.00. Similar to the attribute A (312a), attribute B (312b), and attribute C (312c) depicted in FIG. 3A, the attribute (322) may also be listed in the same user attribute list for mapping to data entry fields of the regulatory filing form. Accordingly, the corresponding user attribute values may be retrieved via the API of the accounting software and the financial management software by the regulatory filing workflow tool and used to generate input data for completing the regulatory filing form, thus generating the regulatory filing report. In one or more embodiments, the user attribute list may list the profit and loss report as a service of the API for providing user attribute values of lower level attributes. Accordingly, the profit and loss report is labeled as the service B (321) shown in the screenshot B (320).

Figure 3C:
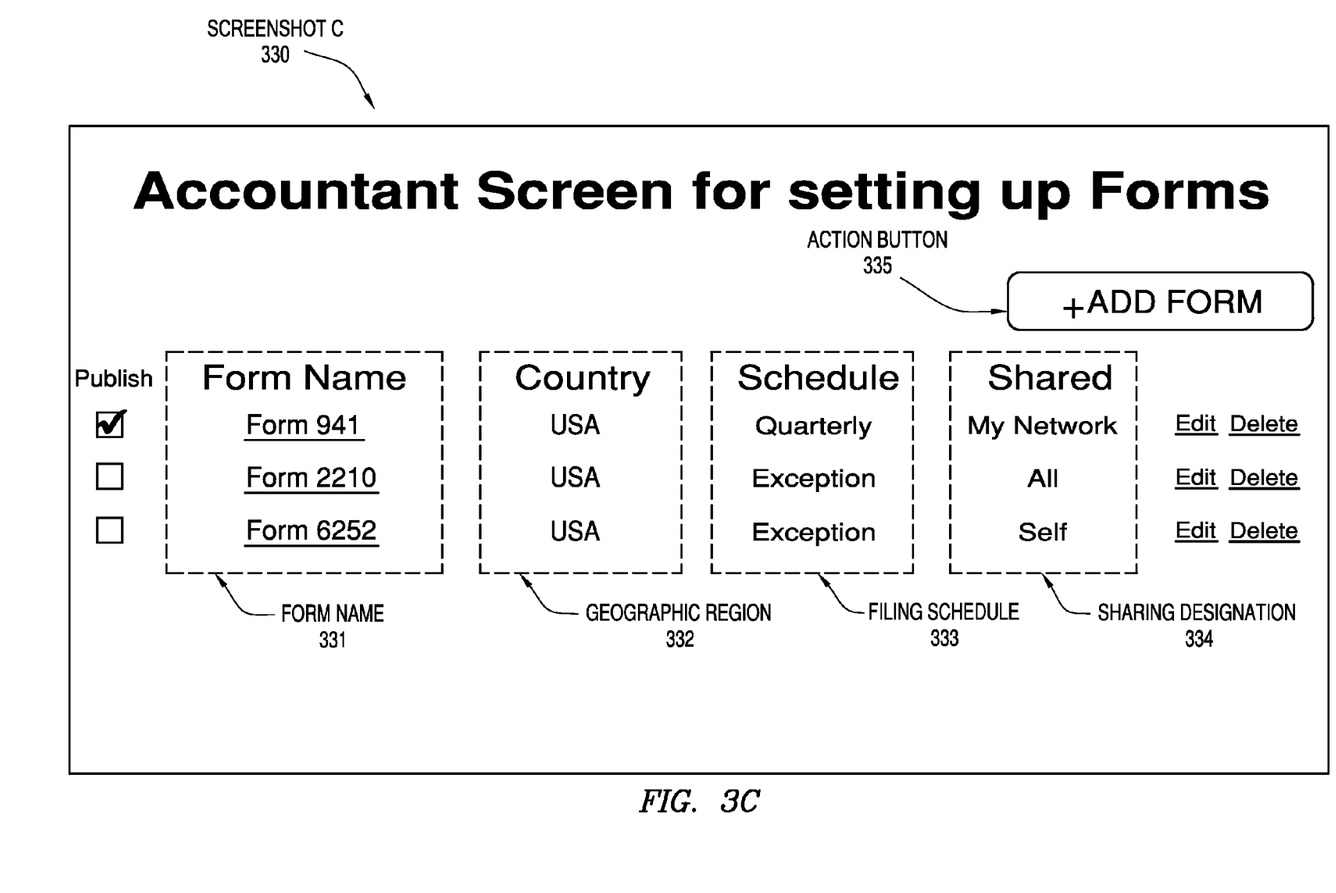

FIG. 3C shows a screenshot C (330) of a user interface menu in the regulatory filing workflow tool, which is used by a CPA user. In particular, the CPA user provides services to the aforementioned SMB user who uses the accounting software and the financial management software depicted in FIG. 3A and FIG. 3B, respectively. Specifically, this user interface menu allows the CPA user to set up the regulatory filing workflow for one or more regulatory filing forms. As shown in FIG. 3C, the screenshot C (330) includes a selection menu of regulatory filing forms, such as form 941, form 2210, and form 6252, generally referred to as the form name (331). Further as shown in FIG. 3C, for each of these regulatory filing forms, the CPA user specifies applicable geographic region (332), filing schedule (333) dictated by the regulatory requirements of the corresponding geographic region, and sharing designation (334) indicating who may have access to use the regulatory filing workflow set up by the CPA user. Using action buttons (e.g., the action button (335)), the CPA user may add additional regulatory filing forms, edit or delete existing regulatory filing forms, or select any particular regulatory filing form to be published to other users according to the sharing designation (334). For example, the CPA user may select the form 941 for editing. As a result, the CPA user is redirected to another user interface menu depicted in FIG. 3D below.

Figure 3D:
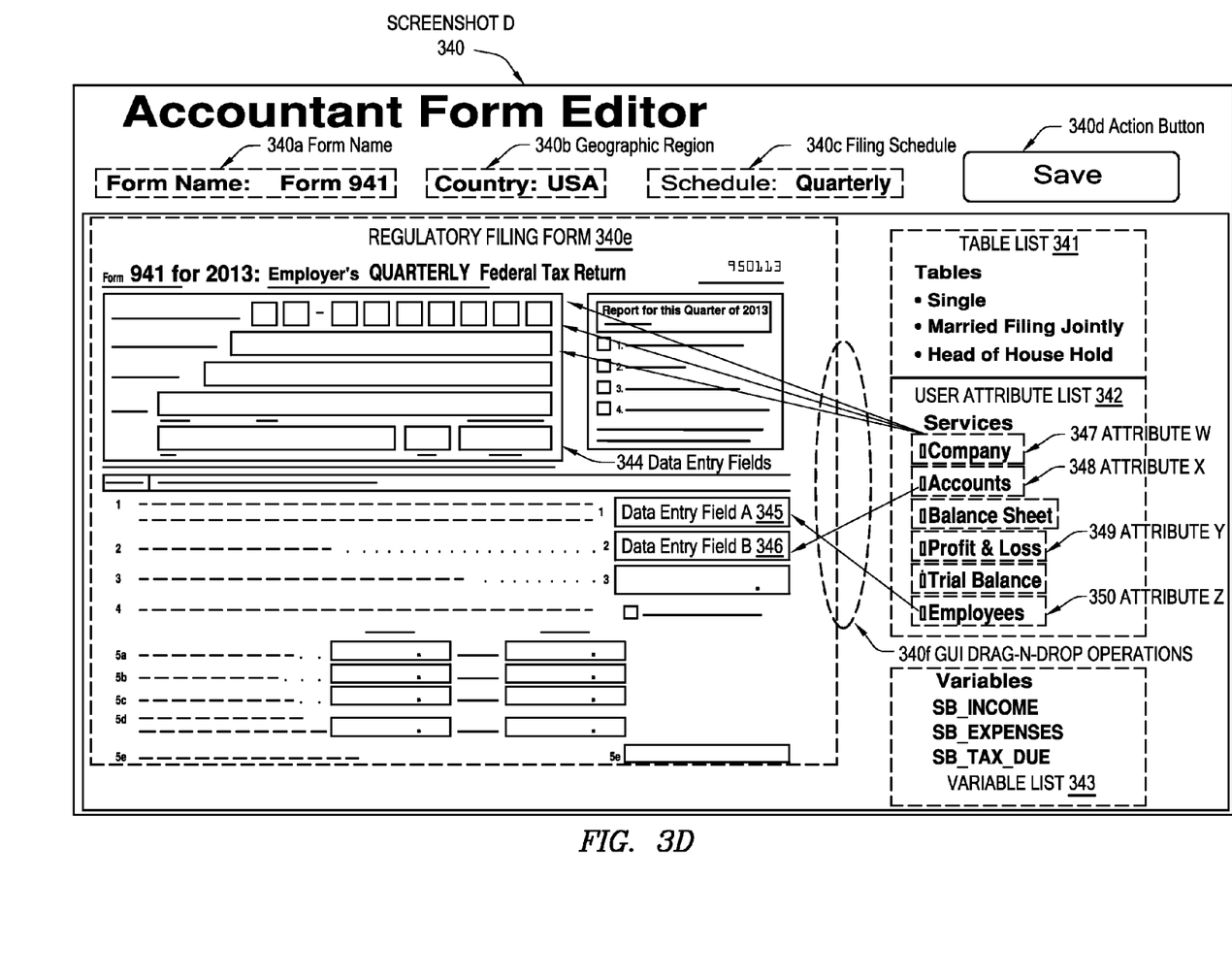

FIG. 3D shows a screenshot D (340) of the user interface menu presented to the CPA user in the regulatory filing workflow tool, as redirected from the screenshot C (330) described above. Specifically, this user interface menu allows the CPA user to set up the regulatory filing workflow based on one or more regulatory filing forms. As shown in FIG. 3C, the screenshot C (330) includes an image of the form 941, referred to as the regulatory filing form (340e). In addition, the form name (340a), geographic region (340b), and filing schedule (340c) were previously specified by the CPA user as shown in FIG. 3C above. Further as shown in FIG. 3D, the screenshot C (330) also includes the user attribute list (342) identifying a list of user attributes, such as the attribute W (347), attribute X (348), attribute Y (349), and attribute Z (350), which correspond to various services provided by the API of the accounting software and financial management software depicted in FIG. 3A and FIG. 3B above. In particular, the attribute X (348) and attribute Y (349) correspond to the service A (311) and service B (321) shown in FIG. 3A and FIG. 3B, respectively. TABLE I shows example lower level user attribute under the attribute W (347) "Company" and the attribute X (348) "Accounts."

TABLE 1

| Company | Accounts |
|---|---|
| Company Id | Account Id |
| Company Name | Account Name |
| Business Type | Account Type |
| Address | Account Balance |
| Country | Account Bank Balance |
| Tax Id | Account parent id (Optional) |
| Trade Name | |
| Industry Type | |
| eMail | |
| Phone | |

Using the regulatory filing form (340e) and the user attribute list (342), the CPA user uses GUI drag-N-drop operations (340f) to map the attribute W (347) to the data entry fields (344), map the attribute X (348) to the data entry field B (346), and map the attribute Z (350) to the data entry field A (345). Lower level user attribute may be further selected by the CPA user clicking on one of the attribute W (347), attribute X (348), attribute Y (349), and attribute Z (350) for mapping to the corresponding data entry field.

In addition to simple mapping of a data entry field to a user attribute from a service, the mapping may be based on some criteria. For example, the data entry field A (345) "Number of Employees" may be specified by the CPA user using a formula such as COUNT(Services.Employees [$start_date:$report_date]) where count( ) is a pre-defined mathematical rule and/or filter, such as a range or a set of values. In another example, the data entry field B (346) "Wages, Tips, and other compensation" may be specified by the CPA user using a formula such as:

SUM(Services.Accounts [Accounts IN "INCOME",
"BONUS"][$start_date:$report_date]), or
Services.Accounts[Account="INCOME"][$start_date:$report_date])+Services.Accounts[Account="BONUS"][$start_date:$report_date]).

One or more of these formula may be defined as variables for more complicated calculations, such as SB_INCOME, SB_EXPENSES, and SB_TAB_DUE shown in the variable list (343). In addition, pre-determined look-up tables may be listed in the table list (341) and selected by the CPA user to use for calculating input data for a particular data entry field. For example, the table list (341) may include various tax rate table specific to the tax jurisdiction identified by the geographic region (340b). Although not explicitly shown in FIG. 3D, the CPA user may also specify the regulatory filing agency and other required filing details for filing the regulatory filing form (340e). Once the rules for determining/calculating input data for various data entry fields and the filing agency/other details are specified by the CPA user, the CPA user may save the results as a regulatory filing workflow using the action button (340d). For example, the regulatory filing workflow may be saved in metadata format, referred to as regulatory filing report metadata.

Figure 3E:
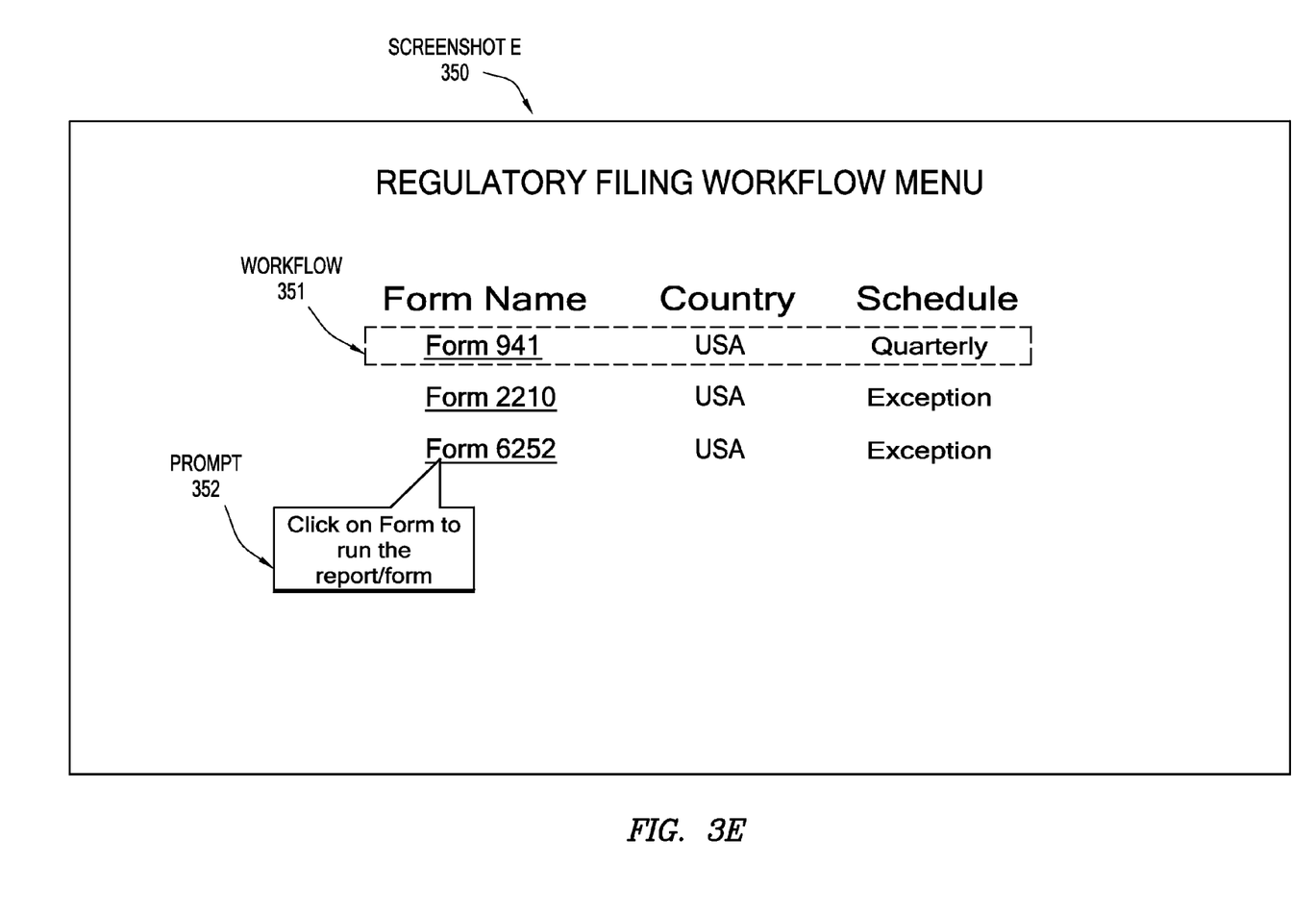

FIG. 3E shows a screenshot E (350) of a user interface menu in a regulatory filing workflow tool, which may be presented to the SMB user or the CPA user. Specifically, as indicated by the prompt (352), this user interface menu allows the SMB user (or the CPA user on behalf of the SMB user) to select any regulatory filing workflow (for example the workflow (351) as defined by the CPA user) for automatic execution based on the pre-defined schedule.

Figure 4:
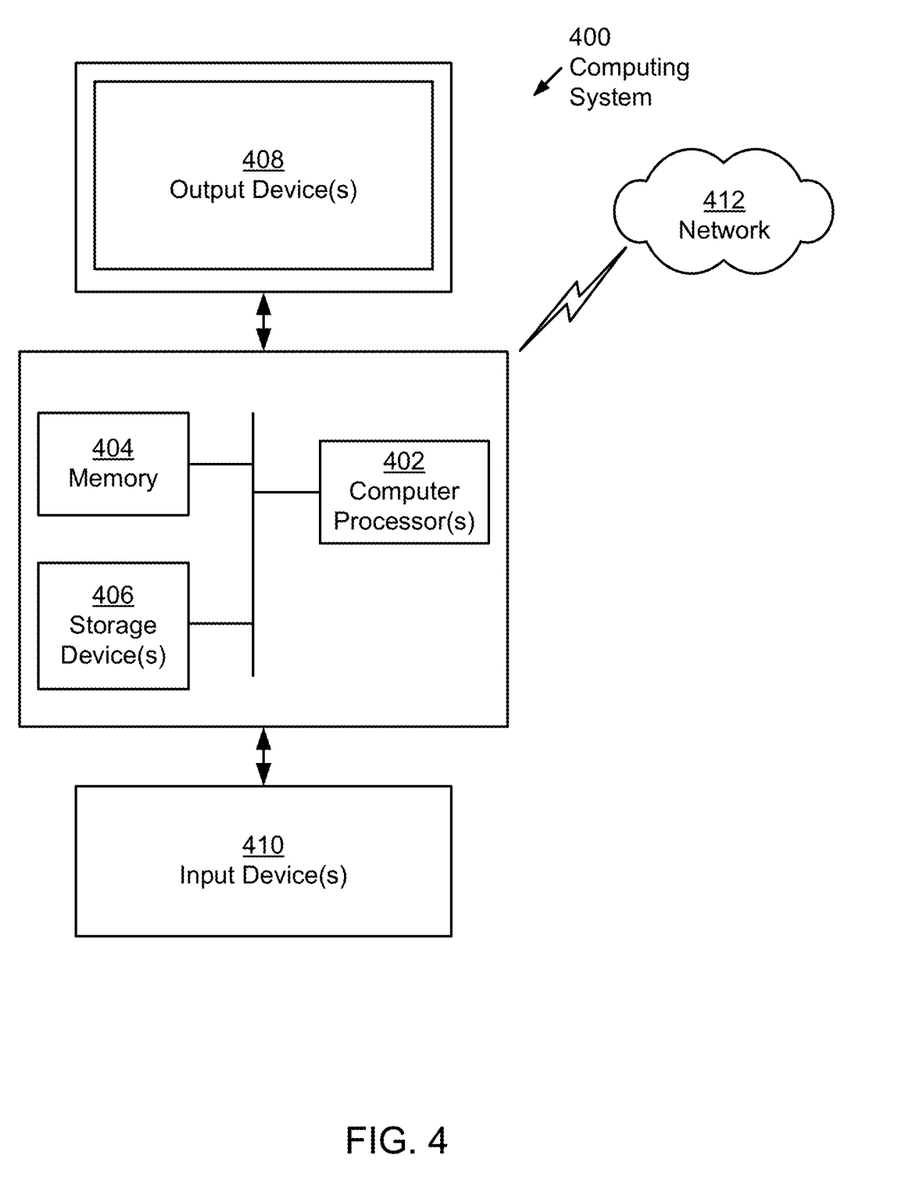
FIG. 4 shows a diagram of a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to generate a regulatory filing workflow for a geographical region, comprising:
    obtaining regulatory filing form metadata,
        wherein the regulatory filing form metadata specifies a non-data-entry portion and a data-entry portion of a regulatory filing form,
        wherein the regulatory filing form is based on a regulatory requirement specific to the geographical region,
        wherein the data-entry-field portion comprises a plurality of data entry fields, and
        wherein the regulatory filing form is displayed by a user device based on the regulatory filing form metadata, and
        wherein using an action button on a first user interface menu in a regulatory filing workflow tool redirects the user to another user interface menu from the first user interface menu to add, select, or edit the regulatory filing form and to set up the regulatory filing workflow based on the regulatory filing form;
    generating a user attribute list identifying a plurality of user attributes from a business management application (BMA) of a plurality of BMAs by accessing an application programming interface (API) of the BMA,
        wherein the user attribute list is displayed with the regulatory filing form by the user device;
    receiving, after the regulatory filing form and the user attribute list are displayed, a specification of a pre-defined formula applied to a range of values to determine input data of a first data entry field of the plurality of data entry fields based at least on a first user attribute of the plurality of user attributes,
        wherein the pre-defined formula includes at least one from a group consisting of a count rule, a sum rule, and a calculation rule; and
    generating a plurality of regulatory filing report metadata,
        wherein the plurality of regulatory filing report metadata comprises a specification for generating a regulatory filing report by completing the regulatory filing form based at least on the pre-defined formula;
    wherein the regulatory filing report is generated by the regulatory filing workflow with the plurality of regulatory filing report metadata; and
    wherein the regulatory requirement specific to the geographical region is satisfied by filing the regulatory filing report with the regulatory filing workflow.

2. The method of claim 1,
    wherein the pre-defined formula is defined as a variable in a variable list.

3. The method of claim 1,
    wherein the user input further specifies a regulatory agency for filing the regulatory filing report, and
    wherein the plurality of regulatory filing report metadata further comprises the regulatory agency.

4. The method of claim 1,
    wherein the user input further specifies a filing schedule dictated by the regulatory requirement, and
    wherein the plurality of regulatory filing report metadata further comprises the filing schedule.

5. The method of claim 4,
    wherein the first user is an accountant user using the plurality of BMAs for preparing a tax return of a second user based on the regulatory requirement,
    wherein the second user is a client of the accountant user and uses the plurality of BMAs to manage business activities of the second user in the geographical region, and
    wherein the first user attribute is assigned a value specific to the second user within at least one of the plurality of BMAs for tracking the business activities of the second user.

6. The method of claim 5,
    wherein the regulatory filing report is determined as due to file for the second user according to the filing schedule, and wherein the regulatory filing workflow is performed, in response to the determining and without intervention from the second user, to render the second user in compliance with the regulatory requirement.

7. The method of claim 6, wherein generating and filing the regulatory filing report comprises:
    obtaining, from the at least one of the plurality of BMAs, the value assigned to the first user attribute;
    generating the regulatory filing report by completing the regulatory filing form based at least on the pre-defined formula and the value;
    submitting the regulatory filing report to the accountant user for review;
    receiving an approval from the accountant user in response to the submitting; and
    filing the regulatory filing report in response to the approval.

8. A system for generating a regulatory filing workflow for a geographical region, comprising:
    a processor;
    memory storing instructions executable by the processor, wherein the instructions comprise:
    a filing form import module configured to:
    obtain regulatory filing form metadata,
        wherein the regulatory filing form metadata specifies a non-data-entry portion and a data-entry portion of a regulatory filing form,
        wherein the regulatory filing form is based on a regulatory requirement specific to the geographical region,
        wherein the data-entry-field portion comprises a plurality of data entry fields,
        wherein the regulatory filing form is displayed by a user device based on the regulatory filing form metadata, and
        wherein using an action button on a first user interface menu in a regulatory filing workflow tool redirects the user to another user interface menu from the first user interface menu to add, select, or edit the regulatory filing form and to set up the regulatory filing workflow based on the regulatory filing form; and
    a filing report specification module configured to:
    generate a user attribute list identifying a plurality of user attributes from a business management application (BMA) of a plurality of BMAs by accessing an application programming interface (API) of the BMA,
        wherein the user attribute list is displayed with the regulatory filing form by the user device;

receive, after the regulatory filing form and the user attribute list are displayed, a specification of a pre-defined formula applied to a range of values to determine input data of a first data entry field of the plurality of data entry fields based at least on a first user attribute of the plurality of user attributes,
 wherein the pre-defined formula includes at least one from a group consisting of a count rule, a sum rule, and a calculation rule; and
generate a plurality of regulatory filing report metadata, wherein the plurality of regulatory filing report metadata comprises a specification for generating a regulatory filing report by completing the regulatory filing form based at least on the pre-defined formula; and
a repository for storing the regulatory filing form metadata and the plurality of regulatory filing report metadata;
wherein the regulatory filing report is generated by the regulatory filing workflow with the plurality of regulatory filing report metadata; and
wherein the regulatory requirement specific to the geographical region is satisfied by filing the regulatory filing report with the regulatory filing workflow.

9. The system of claim 8,
wherein the pre-defined formula is defined as a variable in a variable list.

10. The system of claim 8,
wherein the user input further specifies a regulatory agency for filing the regulatory filing report, and
wherein the plurality of regulatory filing report metadata further comprises the regulatory agency.

11. The system of claim 8,
wherein the user input further specifies a filing schedule dictated by the regulatory requirement, and
wherein the plurality of regulatory filing report metadata further comprises the filing schedule.

12. The system of claim 11,
wherein the first user is an accountant user using the plurality of BMAs for preparing a tax return of a second user based on the regulatory requirement,
wherein the second user is a client of the accountant user and uses the plurality of BMAs to manage business activities of the second user in the geographical region, and
wherein the first user attribute is assigned a value specific to the second user within at least one of the plurality of BMAs for tracking the business activities of the second user.

13. The system of claim 12, further comprising a regulatory filing module configured to:
determine that the regulatory filing report is due to file for the second user according to the filing schedule; and
perform, in response to the determining and without intervention from the second user, the regulatory filing workflow to render the second user in compliance with the regulatory requirement.

14. The system of claim 13, wherein generating and filing the regulatory filing report comprises:
obtaining, from the at least one of the plurality of BMAs, the value assigned to the first user attribute;
generating the regulatory filing report by completing the regulatory filing form based at least on the pre-defined formula and the value;
submitting the regulatory filing report to the accountant user for review;
receiving an approval from the accountant user in response to the submitting; and
filing the regulatory filing report in response to the approval.

15. A non-transitory computer readable medium storing instructions to generate a regulatory filing workflow for a geographical region, the instructions, when executed by a computer processor, comprising functionality for:
obtaining regulatory filing form metadata,
 wherein the regulatory filing form metadata specifies a non-data-entry portion and a data-entry portion of a regulatory filing form,
 wherein the regulatory filing form is based on a regulatory requirement specific to the geographical region,
 wherein the data-entry-field portion comprises a plurality of data entry fields,
 wherein the regulatory filing form is displayed by a user device based on the regulatory filing form metadata, and
 wherein using an action button on a first user interface menu in a regulatory filing workflow tool redirects the user to another user interface menu from the first user interface menu to add, select, or edit the regulatory filing form and to set up the regulatory filing workflow based on the regulatory filing form;
generating a user attribute list identifying a plurality of user attributes from a business management application (BMA) of a plurality of BMAs by accessing an application programming interface (API) of the BMA,
 wherein the user attribute list is displayed with the regulatory filing form by the user device;
receiving, after the regulatory filing form and the user attribute list are displayed, a specification of a pre-defined formula applied to a range of values to determine input data of a first data entry field of the plurality of data entry fields based at least on a first user attribute of the plurality of user attributes,
 wherein the pre-defined formula includes at least one from a group consisting of a count rule, a sum rule, and a calculation rule; and
generating a plurality of regulatory filing report metadata, wherein the plurality of regulatory filing report metadata comprises a specification for generating a regulatory filing report by completing the regulatory filing form based at least on the pre-defined formula;
wherein the regulatory filing report is generated by the regulatory filing workflow with the plurality of regulatory filing report metadata; and
wherein the regulatory requirement specific to the geographical region is satisfied by filing the regulatory filing report with the regulatory filing workflow.

16. The non-transitory computer readable medium of claim 15,
wherein the pre-defined formula is defined as a variable in a variable list.

17. The non-transitory computer readable medium of claim 15,
wherein the user input further specifies a regulatory agency for filing the regulatory filing report, and
wherein the plurality of regulatory filing report metadata further comprises the regulatory agency.

18. The non-transitory computer readable medium of claim 15,
wherein the user input further specifies a filing schedule dictated by the regulatory requirement, and
wherein the plurality of regulatory filing report metadata further comprises the filing schedule.

19. The non-transitory computer readable medium of claim 18,
   wherein the first user is an accountant user using the plurality of BMAs for preparing a tax return of a second user based on the regulatory requirement,
   wherein the second user is a client of the accountant user and uses the plurality of BMAs to manage business activities of the second user in the geographical region, and
   wherein the first user attribute is assigned a value specific to the second user within at least one of the plurality of BMAs for tracking the business activities of the second user.

20. The non-transitory computer readable medium of claim 19,
   wherein the regulatory filing report is determined as due to file for the second user according to the filing schedule, and
   wherein the regulatory filing workflow is performed, in response to the determining and without intervention from the second user, to render the second user in compliance with the regulatory requirement.

21. The non-transitory computer readable medium of claim 20, wherein generating and filing the regulatory filing report comprises:
   obtaining, from the at least one of the plurality of BMAs, the value assigned to the first user attribute;
   generating the regulatory filing report by completing the regulatory filing form based at least on the pre-defined formula and the value;
   submitting the regulatory filing report to the accountant user for review;
   receiving an approval from the accountant user in response to the submitting; and
   filing the regulatory filing report in response to the approval.

* * * * *